(12) United States Patent
Cotteverte et al.

(10) Patent No.: US 6,523,997 B1
(45) Date of Patent: Feb. 25, 2003

(54) RECEIVING DEVICE FOR AT LEAST ONE SHAFT SUPPORTED IN SEALING FASHION IN A HOUSING

(75) Inventors: Patrick Cotteverte, Illkirch Graffenstaden (FR); Christian Rohe, Drusenheim (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/959,741

(22) PCT Filed: May 3, 2000

(86) PCT No.: PCT/DE00/01364

§ 371 (c)(1),
(2), (4) Date: Jan. 16, 2002

(87) PCT Pub. No.: WO00/68588

PCT Pub. Date: Nov. 16, 2000

(30) Foreign Application Priority Data

May 5, 1999 (DE) ............................................. 199 20 597

(51) Int. Cl.$^7$ ............................. B29C 39/22; F16C 9/00
(52) U.S. Cl. ................................... 366/331; 277/370
(58) Field of Search ............................... 366/331, 332, 366/289, 78, 79, 83; 277/430, 431, 527, 534, 370

(56) References Cited

U.S. PATENT DOCUMENTS

| | | | |
|---|---|---|---|
| 1,861,081 A | * 5/1932 | Foresman | |
| 3,804,423 A | * 4/1974 | Booy | |
| 4,521,026 A | * 6/1985 | Eide | |
| 4,878,677 A | * 11/1989 | Larkins et al. | ............... 366/331 |
| 6,164,811 A | * 12/2000 | Planeta et al. | ............... 366/331 |
| 6,270,247 B1 | * 8/2001 | Tschopp | ............... 366/331 |
| 6,390,666 B1 | * 5/2002 | Schafer et al. | ............... 366/331 |

FOREIGN PATENT DOCUMENTS

DE      1 035 585      * 8/1958

* cited by examiner

*Primary Examiner*—Tony G. Soohoo
(74) *Attorney, Agent, or Firm*—Ronald E. Greigg

(57) ABSTRACT

A receiving device for at least one extrusion worm, disposed in a housing of an extruder, has receiving shafts for the extrusion worms. The receiving shafts are surrounded by slide ring seals, which in turn are disposed in a sealing housing. The receiving shafts are disposed, together with the slide ring seals and the sealing housing, axially displaceably relative to the housing on a frame. The receiving device of the invention prevents damage or harm to the slide ring seals upon removal of the extrusion worms from the housing or installation into it.

12 Claims, 3 Drawing Sheets

RECEIVING DEVICE FOR AT LEAST ONE SHAFT SUPPORTED IN SEALING FASHION IN A HOUSING

CROSS-REFERENCE TO RELATED APPLICATIONS

This application is a 35 USC 371 application of PCT/DE 00/01364 filed on May 3, 2001.

BACKGROUND OF THE INVENTION

1. Field of the Invention

The invention relates to a receiving device for at least one shaft, supported sealingly in a housing.

2. Description of the Prior Art

In one known receiving device, the shaft, embodied as an extrusion worm, is surrounded directly by a seal, which seals off the shaft from the housing wall of an extruder. As a consequence, when the shaft is removed and installed, for example if the housing interior has to be cleaned, damage or harm to the seal can occur because of the direct contact with the shaft. The object of the invention is therefore to avert such damage or harm upon removal or installation of a shaft from or into a housing.

SUMMARY OF THE INVENTION

The receiving device of the invention for at least one shaft supported sealingly in a housing has the advantage over the prior art that the shaft is separated from the seal by a protective element, so that there is no direct contact between the shaft and the seal. As a result, damage or harm to the seal upon removal or installation of the shaft is effectively averted.

BRIEF DESCRIPTION OF THE DRAWINGS

One exemplary embodiment of the invention is shown in the drawing and will be described in further detail below. Shown are.

DESCRIPTION OF THE PREFERRED EMBODIMENTS

Figure 1:
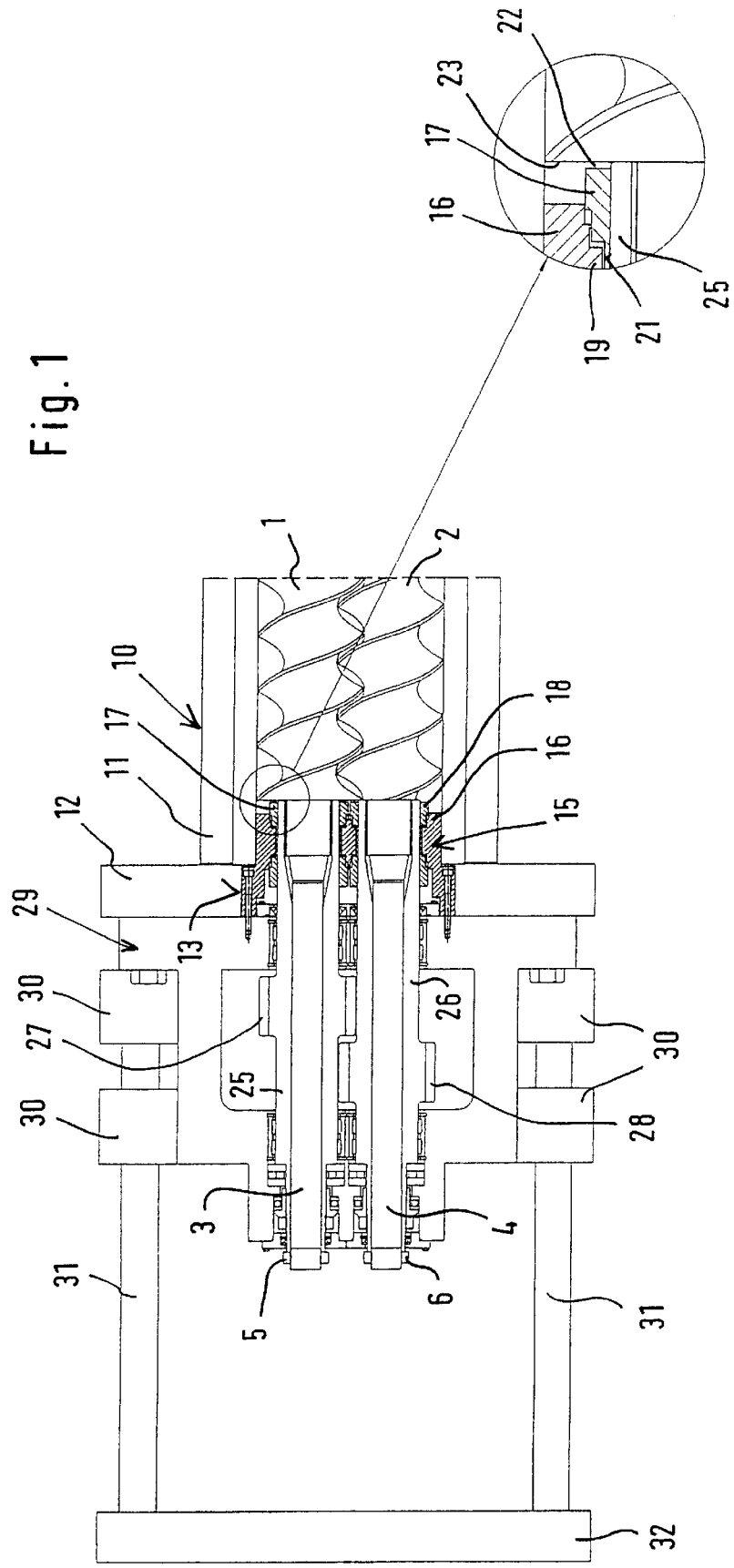
FIG. 1 shows one part of an extruder with extrusion worms mounted on it, in a side view partly in section.

The extruder identified by reference numeral 10 in FIG. 1 is used in the candy-making industry to process candy compositions. The extruder 10 has a housing 11, which is tightly closed on one face end by a housing cap or wall 12. Essentially inside the housing 11, there are two parallel extrusion worms 1, 2, whose drive shafts 3, 4 are located on the side of the housing cap 12 remote from the housing 11. The housing cap 12 has a recess 13, in the form of an aperture. A unit 15, comprising a sleevelike sealing housing 16, which for each extrusion worm 1, 2 surrounds one slide ring seal 17, 18, can be inserted in sealing fashion into this recess 13. The sealing housing 16, on its inside circumference, has encompassing collars 19 for each slide ring seal 17, 18. The collars 19 are guided in encompassing annular grooves 21 of the slide ring seals 17, 18. Essentially sleevelike receiving shafts 25, 26 for the drive shafts 3, 4 of the extrusion worms 1, 2 can be inserted into the slide ring seals 17, 18. The length of the receiving shafts 25, 26 is dimensioned such that with the extrusion worms 1, 2 mounted, an axial play 22 or spacing is formed between the face ends of the slide ring seals 17, 18 and the end faces 23 of the threads of the extrusion worms (see the detail in FIG. 1). This is accomplished by providing that the receiving shafts 25, 26 protrude somewhat from the slide ring seals 17, 18.

The receiving shafts 25, 26, on their outer circumference, have sets of teeth 27, 28, by way of which the extrusion worms 1, 2 can be driven by means of a drive mechanism, not shown. The axial fixation of the extrusion worms 1, 2 in the receiving shafts 25, 26 is done by means of fastening nuts 5, 6, which can be mounted on the ends of the drive shafts 3, 4 that protrude out of the receiving shafts 25, 26.

The receiving shafts 25, 26 are supported in a frame 29, which in turn has guide eyelets 30 in which guide rods 31 are guided. The guide rods 31 are secured, together with a closure plate 32, to the housing cap 12 of the extruder 10. In addition, the unit 15 can be connected to the face end 34 toward it of the frame 29 by means of screws 33.

Figure 2:
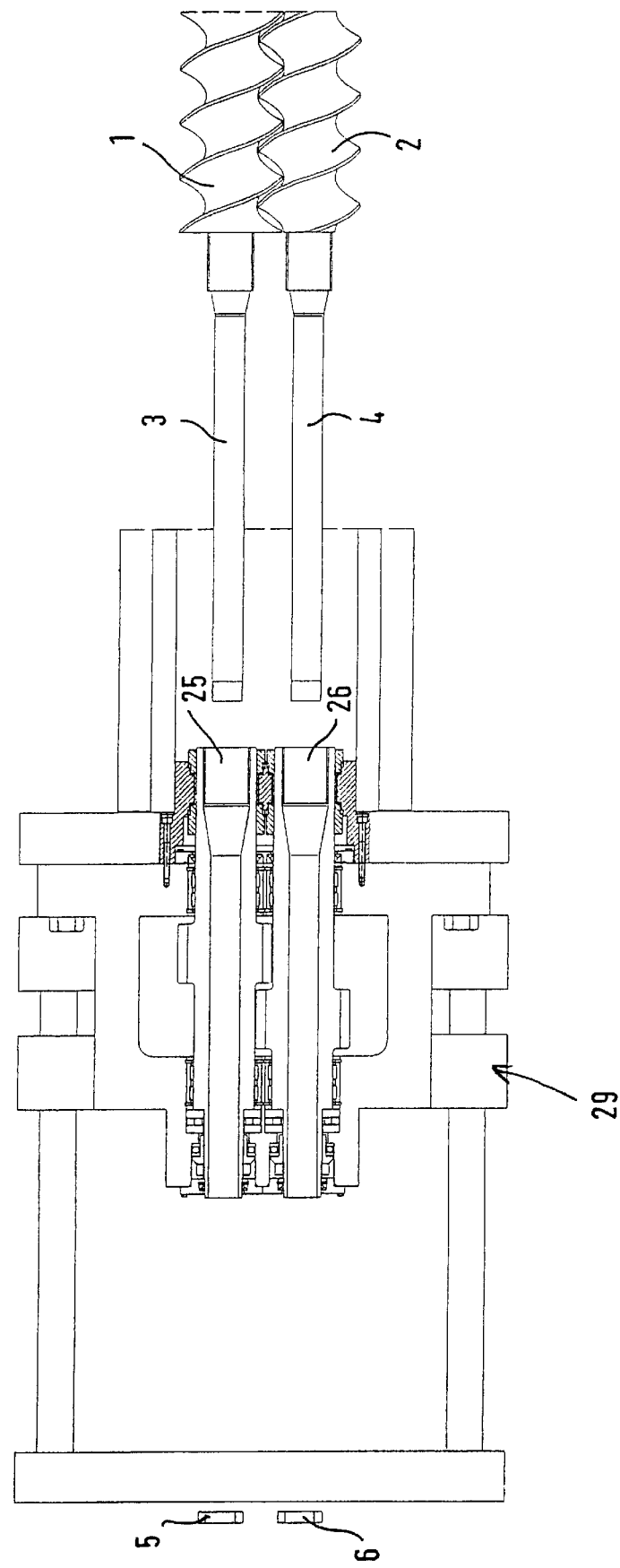
FIGS. 2 and 3 show the extruder of FIG. 1 during the removal of the extrusion worms and of a sealing unit, again in side views shown partly in section.

The above-described embodiment has the effect that the receiving shafts 25, 26 are aligned both with the unit 15 and with the recess 13 in the housing cap 12. For removal of the extrusion worms 1, 2 from the housing 11, all that has to be done is that the fastening nuts 5, 6 are unscrewed, so that the extrusion worms 1, 2 can be pulled out of the receiving shafts 25, 26 (see FIG. 2). The extrusion worms 1, 2 are mechanically decoupled from the slide ring seals 17, 18; that is, no stresses whatever or damage to the slide ring seals 17, 18 can be exerted via the extrusion worms 1, 2. Installing the extrusion worms 1, 2 is done logically in reverse order. Once again, contact of the extrusion worms 1, 2, or of their drive shafts 3, 4, with the slide ring seals 17, 18 is impossible, because of the drive shafts 25, 26 and additionally because of the axial play 22 relative to the end faces 23 of the threads of the extrusion worms.

Figure 3:
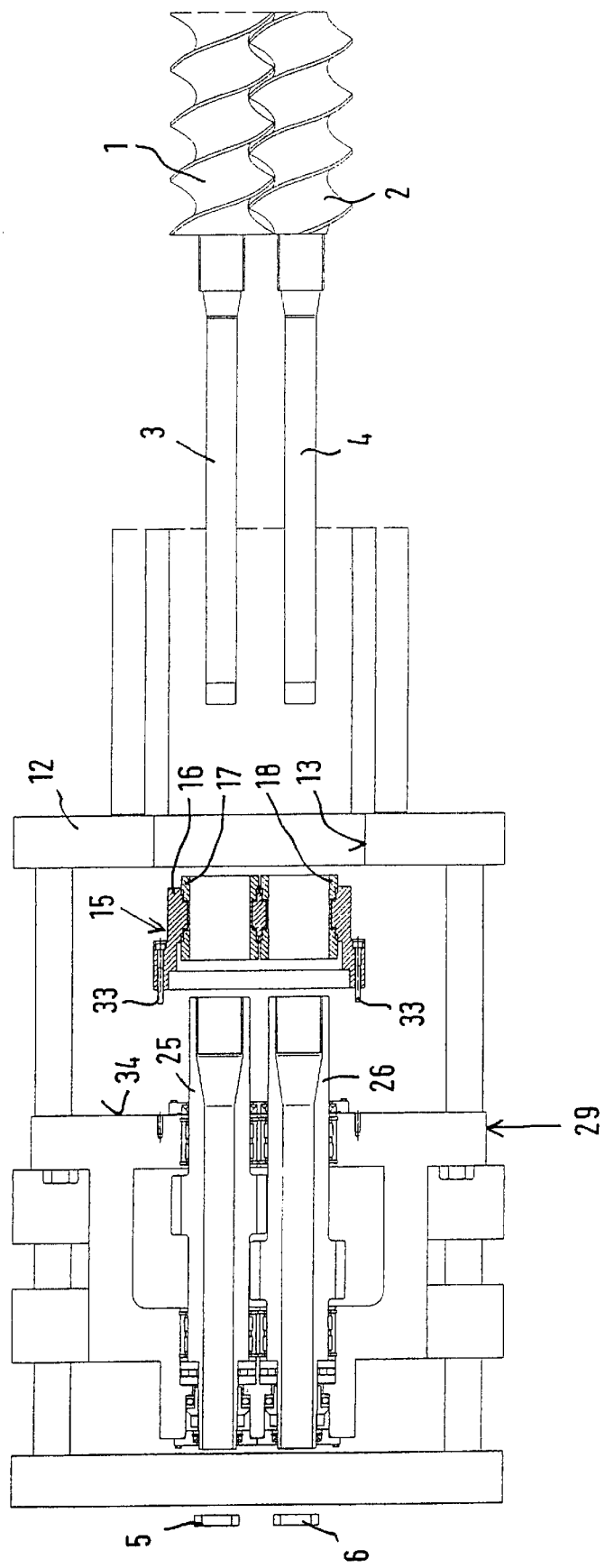

If the slide ring seals 17, 18 require replacement, then the frame 29 (after the removal of the extrusion worms 1, 2) in the guide rods 31 is moved away from the housing cap 12 of the extruder 10, and the unit 15 is pulled out of the recess 13. After that, the screws 33 can be loosened, so that the unit 15 is removed together with the slide ring seals 17, 18 (FIG. 3).

The foregoing relates to preferred exemplary embodiment of the invention, it being understood that other variants and embodiments thereof are possible within the spirit and scope of the invention, the latter being defined by the appended claims.

What is claimed is:

1. A receiving device for at least one shaft (1, 2), rotatably supported in sealing fashion in a housing (11), comprising a seal (17, 18) associated with the shaft (1, 2), which seal is disposed in a recess (13) of a housing wall (12) that tightly closes a face end of the housing (11), a sleevelike protective element (25, 26) for the seal (17, 18), which protective element is rotatably supported in the seal (17, 18), wherein for installation in and removal from the housing (11) the shaft (1, 2) is axially displaceable in the protective element (25, 26), and wherein the seal (17, 18) is surrounded by a sealing sleeve (16) which together with the seal (17, 18) forms a unit (15) disposed replaceably on the housing wall (12), the protective element (25, 26) being disposed axially displaceably on a frame (29), aligned with the unit (15), on the side of the housing wall (12) opposite the shaft (1, 2).

2. The receiving device of claim 1, wherein the seal (17, 18), on its outer circumference, has an annular groove-like, encompassing recess (21), which is engaged by an encompassing collar (19) of the sealing sleeve (16).

3. The receiving device of claim 2, wherein the protective element (25, 26) protrudes from the seal (17, 18) on the side toward the housing (11), whereby an axial play (22) is formed between the end face of the seal (17, 18) disposed outside the sealing sleeve (16) and an end face (23) of the shaft (1, 2) oriented toward the first end face.

4. The receiving device of claim 3, wherein the unit (15) is insertable into the housing wall (12) from the side of the housing wall opposite the shaft (1, 2).

5. The receiving device of claim 2, wherein the unit (15) is insertable into the housing wall (12) from the side of the housing wall opposite the shaft (1, 2).

6. The receiving device of claim 2, wherein the shaft is an extrusion worm (1, 2), and the housing is the housing (11) of an extruder (10).

7. The receiving device of claim 1, wherein the unit (15) is insertable into the housing wall (12) from the side of the housing wall opposite the shaft (1, 2).

8. The receiving device of claim 1, wherein the shaft is an extrusion worm (1, 2), and the housing is the housing (11) of an extruder (10).

9. The receiving device of claim 1, wherein the seal (17, 18) and the sealing sleeve (16) form a unit (15) disposed replaceably on the housing wall (12).

10. The receiving device of claim 9, wherein the unit (15) is insertable into the housing wall (12) from the side of the housing wall opposite the shaft (1, 2).

11. The receiving device of claim 9, wherein the receiving body (25, 26) is disposed axially displaceably on a frame (29), aligned with the unit (15), on the side of the housing wall (12) opposite the shaft (1, 2).

12. The receiving device of claim 1, wherein the shaft is an extrusion worm (1, 2), and the housing is the housing (11) of an extruder (10).

* * * * *